Nov. 4, 1924.
M. NEWDANA
MOTOR SLEIGH
Filed July 12, 1923
1,514,170
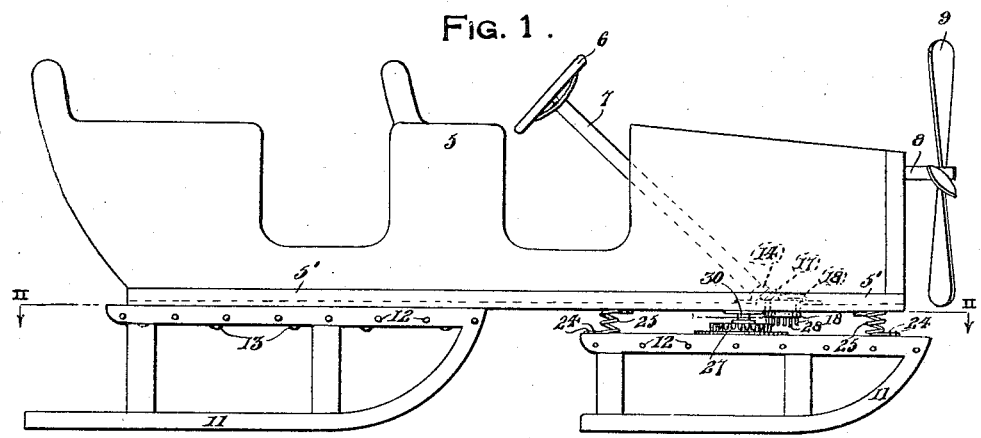
Fig. 1.
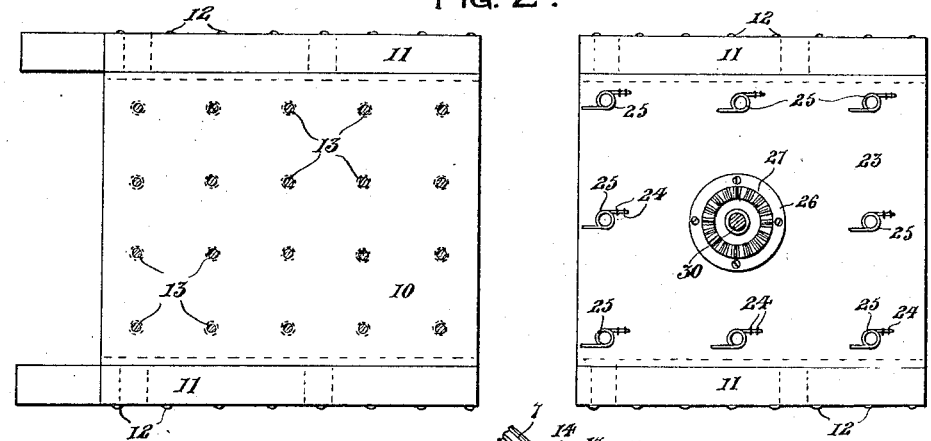
Fig. 2.
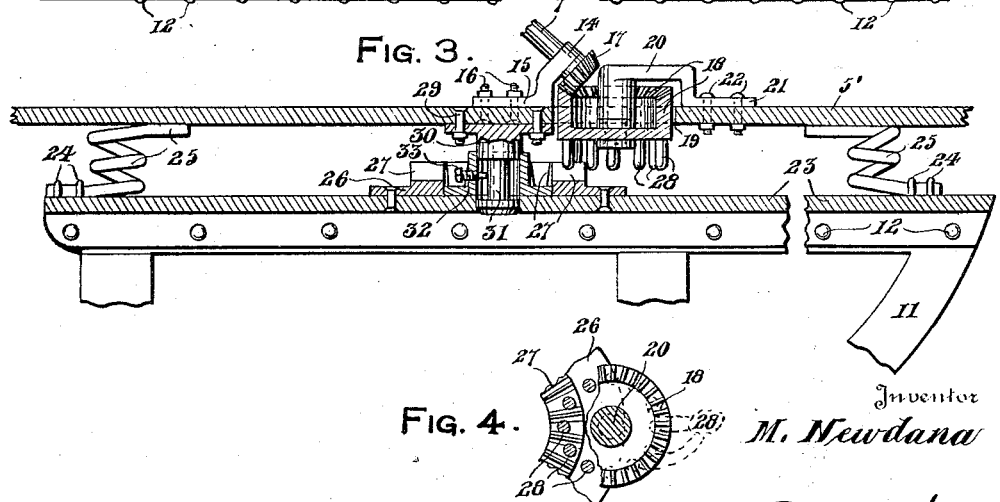
Fig. 3.
Fig. 4.
Inventor
M. Newdana
By J. K. Bryant
Attorney Patented Nov. 4, 1924.

1,514,170

UNITED STATES PATENT OFFICE.

MARTIN NEWDANA, OF TONOPAH, NEVADA.

MOTOR SLEIGH.

Application filed July 12, 1923. Serial No. 651,054.

*To all whom it may concern:*

Be it known that I, MARTIN NEWDANA, a citizen of Poland, residing at Tonopah, in the county of Nye and State of Nevada, have invented certain new and useful Improvements in Motor Sleighs, of which the following is a specification.

This invention relates to improvements in motor sleighs.

An important object of this invention is to provide a sleigh of the type described, wherein novel means is employed for mounting the body of the vehicle on the sleds.

Another object of this invention is to provide a sleigh of the type described, which will readily adapt itself to irregularities in the surface over which it may travel.

A still further object of this invention is to provide a sleigh of the type described wherein novel means are employed to prevent undue strain being placed upon the steering mechanism of the sleigh.

Another object of this invention is to provide a device of the character described which is compact, sturdy in construction, of few parts and one that will not get out of order easily.

Other objects and advantages of this invention will become apparent during the course of the following description, in which—

Figure 1 is a side elevational view of my motor sleigh in complete assembly,

Figure 2 is a plan view taken on line II—II of Fig. 1,

Figure 3 is a fragmentary side elevational view of the steering mechanism and the body supporting means shown partly in section, and Figure 4 is a fragmentary detail view of the steering mechanism used in steering the front sled.

Referring to the drawing in which like numerals designate like parts throughout the several views, the numeral 5 designates the body portion of my improved motor sleigh having the usual body bottom board 5', and a steering wheel 6 mounted on the steering rod 7 in any well known manner. Mounted in the forward end of the body 5 is a shaft 8 to which is secured a propeller 9. It is to be understood that the shaft 8 is to be driven by the usual internal combustion engine, not shown, and receive power therefrom.

The numeral 10 designates the rear sled having the usual runners 11 secured thereto by means of rivets or the like as shown at 12. The sled 10 is further secured to the body bottom board 5' by means of bolts or rivets 13, as clearly shown in Fig. 2.

Referring particularly to Figs. 2 and 3 wherein is shown a new and novel means for mounting the forward sled and steering mechanism, the steering rod 7 is rotatably mounted on a bearing 14 which is provided with a foot member 15, the same being secured to the body bottom board 5' by means of bolts or the like 16.

Formed on the lower end of the steering rod 7 is a bevel gear 17 adapted to coact with a compound bevel gear and pin wheel 18, which is rotatably secured in an opening 19 formed in the body bottom board 5' by means of an inverted U-shaped bearing 20. The bearing 20 is further provided with a foot member 21 which is secured to the bottom body board 5' by means of bolts 22 or the like.

The numeral 23 designates the front sled having the usual runners 11 secured thereto by means of rivets or the like 12. Secured to the sled 23 by means of strap bolts 24 are a plurality of coil springs 25, the said springs adapted for resilient engagement with the bottom body board 5' and being free to move with relation thereto.

Secured to the sled 23 by means of rivets 26 is a crown gear 27 which is adapted to engage the pins 28 of the compound bevel gear and pin wheel 18. Secured to the bottom body board 5' by means of bolts 29 is a vertical shaft 30, having a reduced portion 31 which terminates in an enlarged head 32 which is adapted to project through an opening formed in the sled 23 as clearly shown in Fig. 3 of the drawing. The shaft 30 is suitably journaled in the bearing 32 which carries the stop pin 33 screw-threaded therein which is adapted to engage the reduced portion 31 of the shaft 30 to limit the movement of the same and prevent its accidental displacement.

It will be readily apparent to one familiar in the art that there has been provided a motor sleigh in which the loss due to breakage and undue strain being placed upon the running gear has practically been done away with. By using the resilient springs and a so-called floating connection between the two sets of gears, there is left plenty of room for play between the different parts of the sleigh.

It is to be understood that the form of my invention as herein shown and described is to be taken as the preferred example of the same, and that various changes in the shape, size, and arrangement of parts may be resorted to without departing from the spirit of the invention or the scope of the subjoined claims.

Having thus described my invention, I claim:—

1. In combination with a motor sleigh, having a movable sled for steering purposes, steering mechanism carried by said sleigh and sled comprising a steering rod carrying a bevel gear, a compound bevel gear and pin wheel carried by said sleigh, said bevel gear engaging said first mentioned bevel gear, means carried by said sled for engagement with said pin wheel, and means associated with said sleigh and said first mentioned means for providing a loose connection between the two.

2. In combination with a motor sleigh, having a movable sled for steering purposes, steering mechanism carried by said sleigh and sled comprising a steering rod carrying a bevel gear, means carried by said sleigh for engagement with said bevel gear, a crown gear carried by said sleds adapted to engage said first mentioned means, and means loosely carried by said sleds and crown gear and attached to said sleigh to allow loose engagement between the crown gear, sled and sleigh.

In testimony whereof I affix my signature.

MARTIN NEWDANA.